(12) United States Patent
Cho

(10) Patent No.: US 9,764,479 B2
(45) Date of Patent: Sep. 19, 2017

(54) QUICK-RELEASE VACUUM PUMP

(75) Inventor: Ho-Young Cho, Seoul (KR)

(73) Assignee: KOREA PNEUMATIC SYSTEM CO., LTD., Seoul (KR)

(*) Notice: Subject to any disclaimer, the term of this patent is extended or adjusted under 35 U.S.C. 154(b) by 597 days.

(21) Appl. No.: 14/002,987

(22) PCT Filed: Mar. 14, 2011

(86) PCT No.: PCT/KR2011/001760
§ 371 (c)(1),
(2), (4) Date: Nov. 4, 2013

(87) PCT Pub. No.: WO2012/121442
PCT Pub. Date: Sep. 13, 2012

(65) Prior Publication Data
US 2014/0050595 A1    Feb. 20, 2014

(30) Foreign Application Priority Data
Mar. 10, 2011  (KR) .................. 10-2011-0021483

(51) Int. Cl.
*F04F 5/00*   (2006.01)
*B25J 15/06*  (2006.01)
(Continued)

(52) U.S. Cl.
CPC ....... *B25J 15/0658* (2013.01); *B25J 15/0625* (2013.01); *F04B 53/20* (2013.01);
(Continued)

(58) Field of Classification Search
CPC ...... F04F 5/20; F04F 5/467; F04F 5/54; B25J 15/0658; B25J 15/065; B25J 15/0625; B25B 11/005
See application file for complete search history.

(56) References Cited

U.S. PATENT DOCUMENTS 1,606,803 A * 11/1926 Lalor ................. G05D 16/0655
                                                    137/505.23
4,073,602 A *  2/1978 Cagle ....................... F04F 5/20
                                                      294/64.2
(Continued)

FOREIGN PATENT DOCUMENTS

JP    2002-223288    8/2002
JP    2002-291052    10/2002
(Continued)

*Primary Examiner* — Charles Freay
*Assistant Examiner* — Christopher Bobish
(74) *Attorney, Agent, or Firm* — Innovation Capital Law Group, LLP; Vic Lin

(57) ABSTRACT

A quick-release vacuum pump which is mainly applied to a vacuum transport system. The vacuum pump has a mechanism in which part of compressed air supplied for generating a vacuum state is stored firstly in a chamber, and then the vacuum state within the chamber is released when transportation is completed. When the vacuum state is released, a check valve is moved by the pressure of air that flows backward. The range of movement of the check valve is adjusted by a control means. An air filter is disposed at the lower end of the check valve. The release of the vacuum state is quick and controllable. Also, the filter is naturally filtered and cleaned.

4 Claims, 5 Drawing Sheets

(51) Int. Cl.
*F04F 5/20* (2006.01)
*F04F 5/22* (2006.01)
*F04B 53/20* (2006.01)
*F04F 5/46* (2006.01)
*F04F 5/54* (2006.01)
*F16B 35/00* (2006.01)

(52) U.S. Cl.
CPC ............... *F04F 5/20* (2013.01); *F04F 5/22* (2013.01); *F04F 5/467* (2013.01); *F04F 5/54* (2013.01); *F16B 35/005* (2013.01)

(56) References Cited

U.S. PATENT DOCUMENTS

| | | | |
|---|---|---|---|
| 6,993,367 B2 | 1/2006 | Yamato et al. | |
| 7,308,289 B2 | 12/2007 | Sychta | |
| 7,349,722 B2 | 3/2008 | Witkowski et al. | |
| 7,689,255 B2 | 3/2010 | Kurauchi et al. | |
| 7,909,903 B2 * | 3/2011 | Cho | B01D 46/0012 55/350.1 |
| 8,079,578 B2 * | 12/2011 | Bumgarner | B23Q 1/035 269/21 |
| 8,140,220 B2 | 3/2012 | Fujikawa et al. | |
| 8,190,214 B2 | 5/2012 | Kimura et al. | |
| 8,267,367 B2 * | 9/2012 | Cho | B25B 11/007 248/205.9 |
| 8,395,522 B2 | 3/2013 | Kweon | |
| 8,457,839 B2 | 6/2013 | Schneider et al. | |
| 8,473,012 B2 | 6/2013 | Varela et al. | |
| 8,478,358 B2 | 7/2013 | Saito | |
| 2007/0006940 A1 * | 1/2007 | Perlman | B25B 11/007 141/65 |
| 2007/0148009 A1 * | 6/2007 | Cho | F04F 5/467 417/174 |
| 2008/0249510 A1 * | 10/2008 | Mescher | G05D 7/0113 604/890.1 |
| 2010/0305807 A1 | 12/2010 | Basir et al. | |
| 2011/0257973 A1 | 10/2011 | Chutorash et al. | |
| 2015/0336278 A1 * | 11/2015 | Perlman | B25B 11/007 294/64.2 |

FOREIGN PATENT DOCUMENTS

| | | |
|---|---|---|
| JP | 2009-027403 | 2/2009 |
| WO | 2009-073806 | 6/2009 |

* cited by examiner

[Fig. 1]
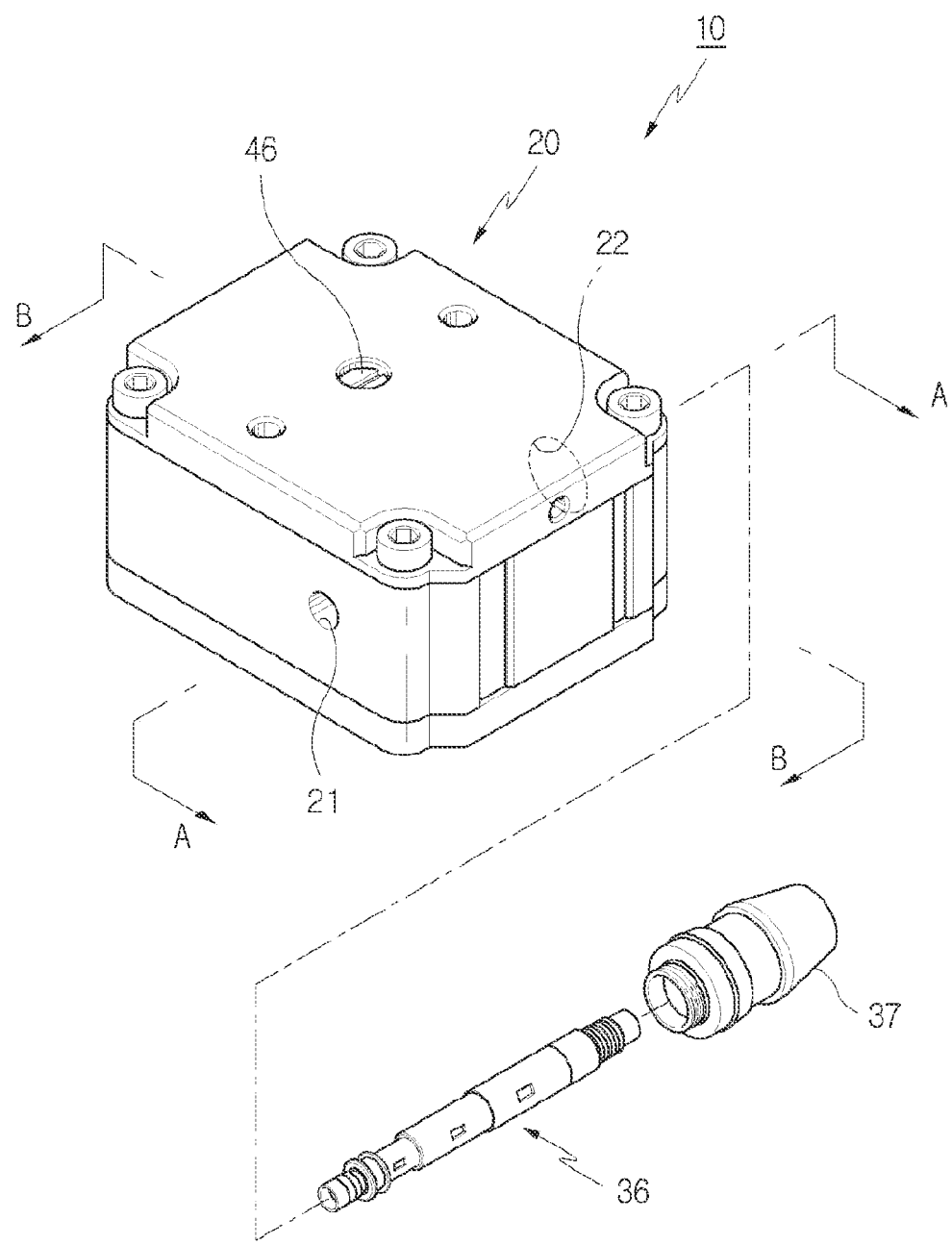

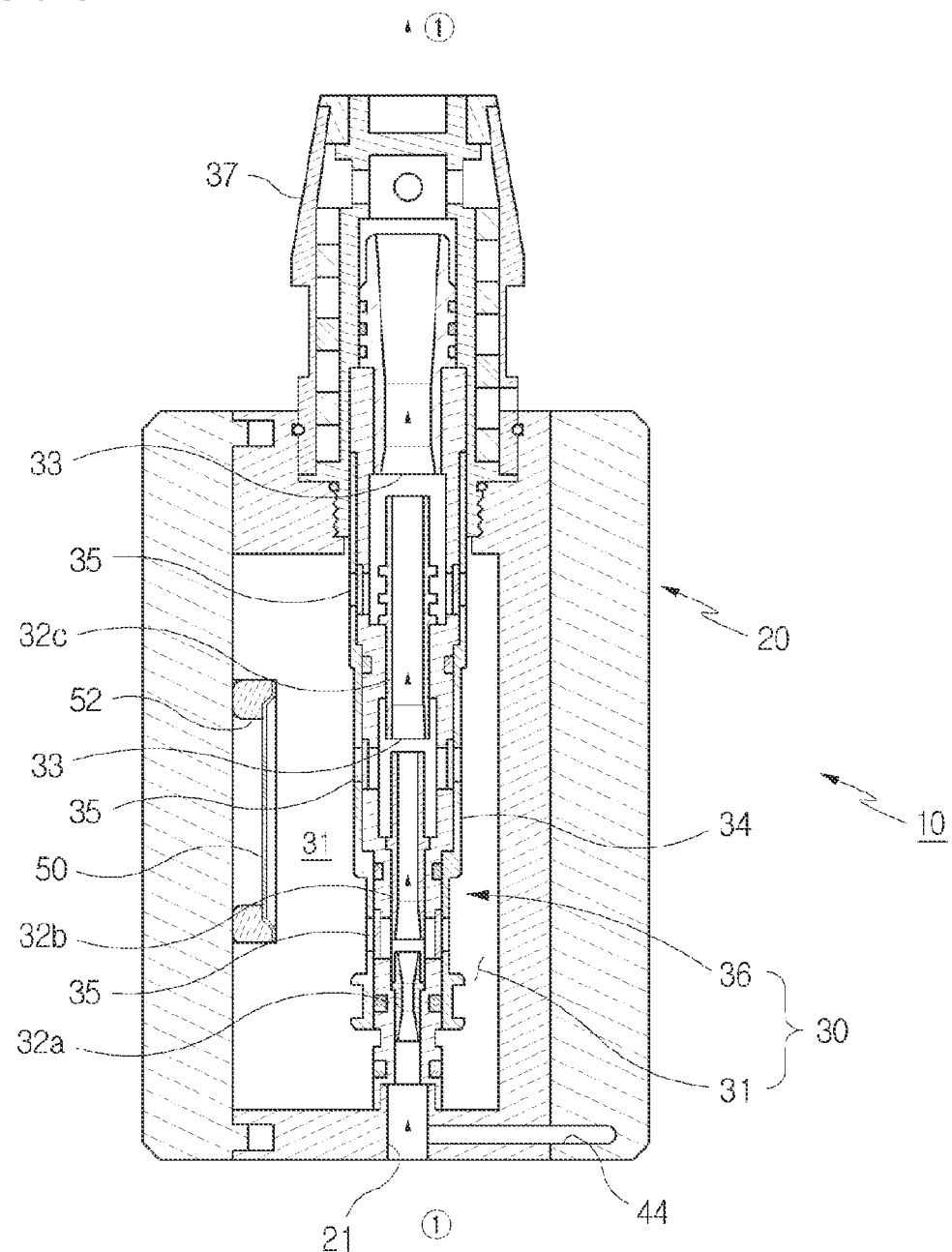
[Fig. 2]

[Fig. 3]
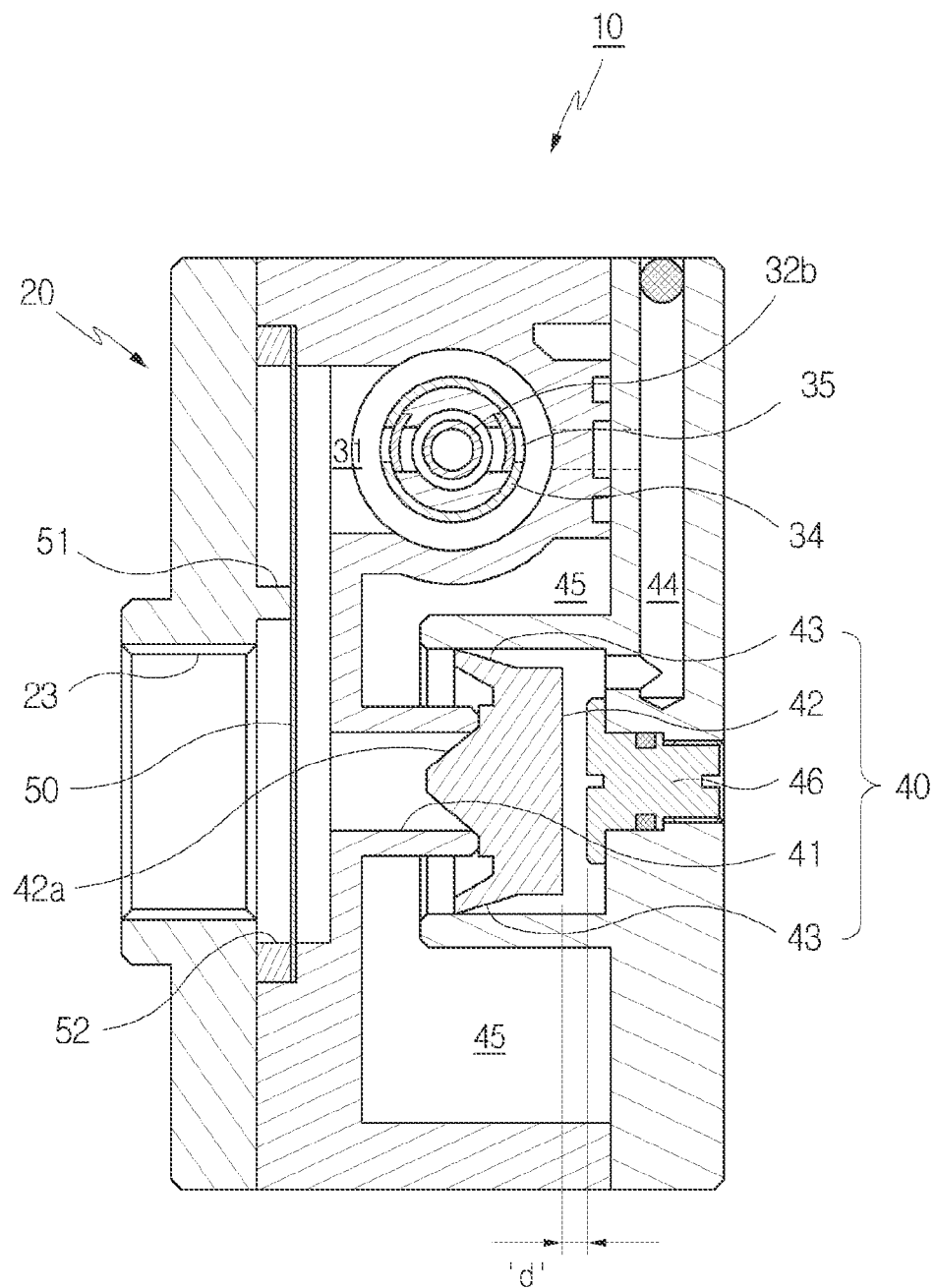

[Fig. 4]
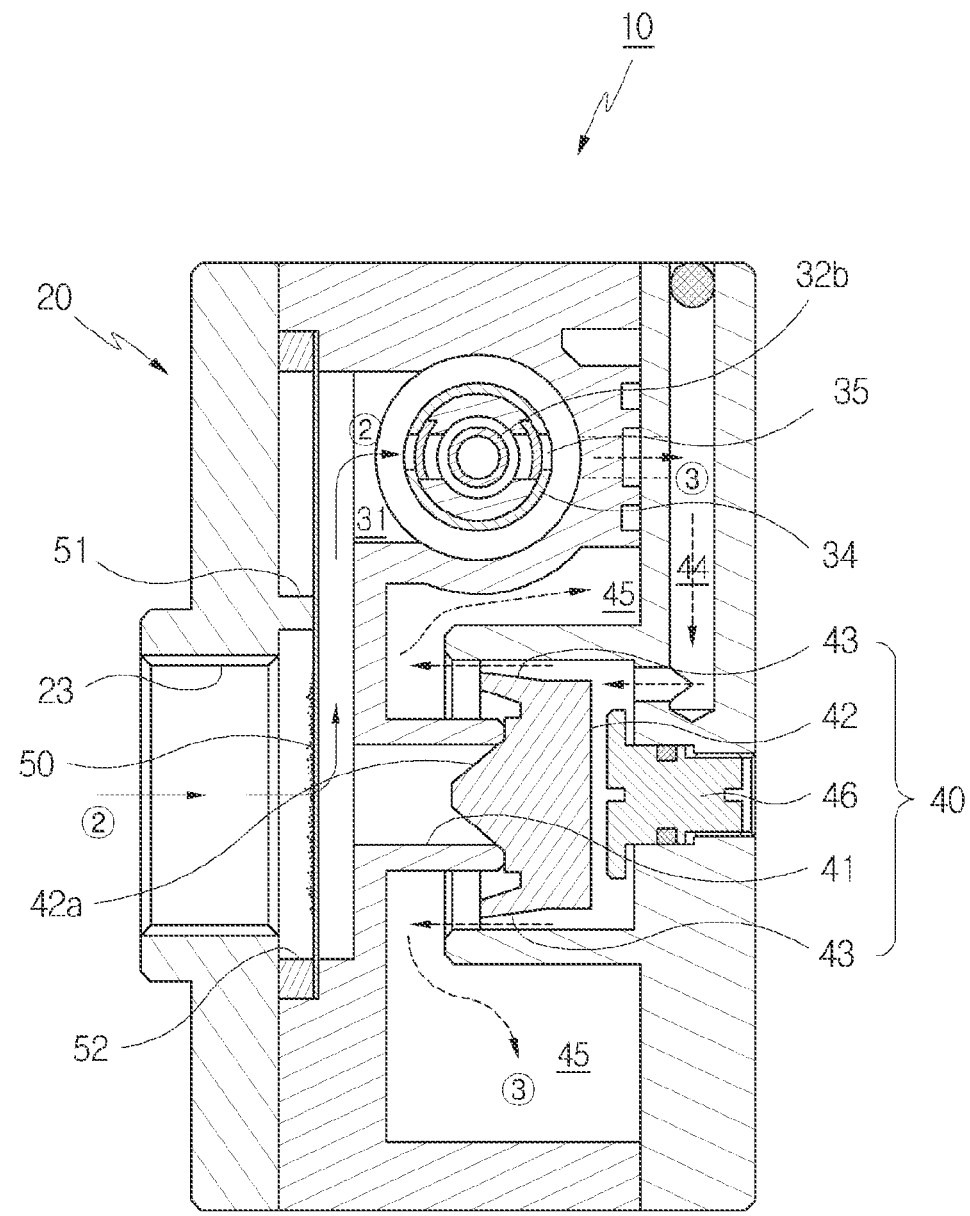

[Fig. 5]
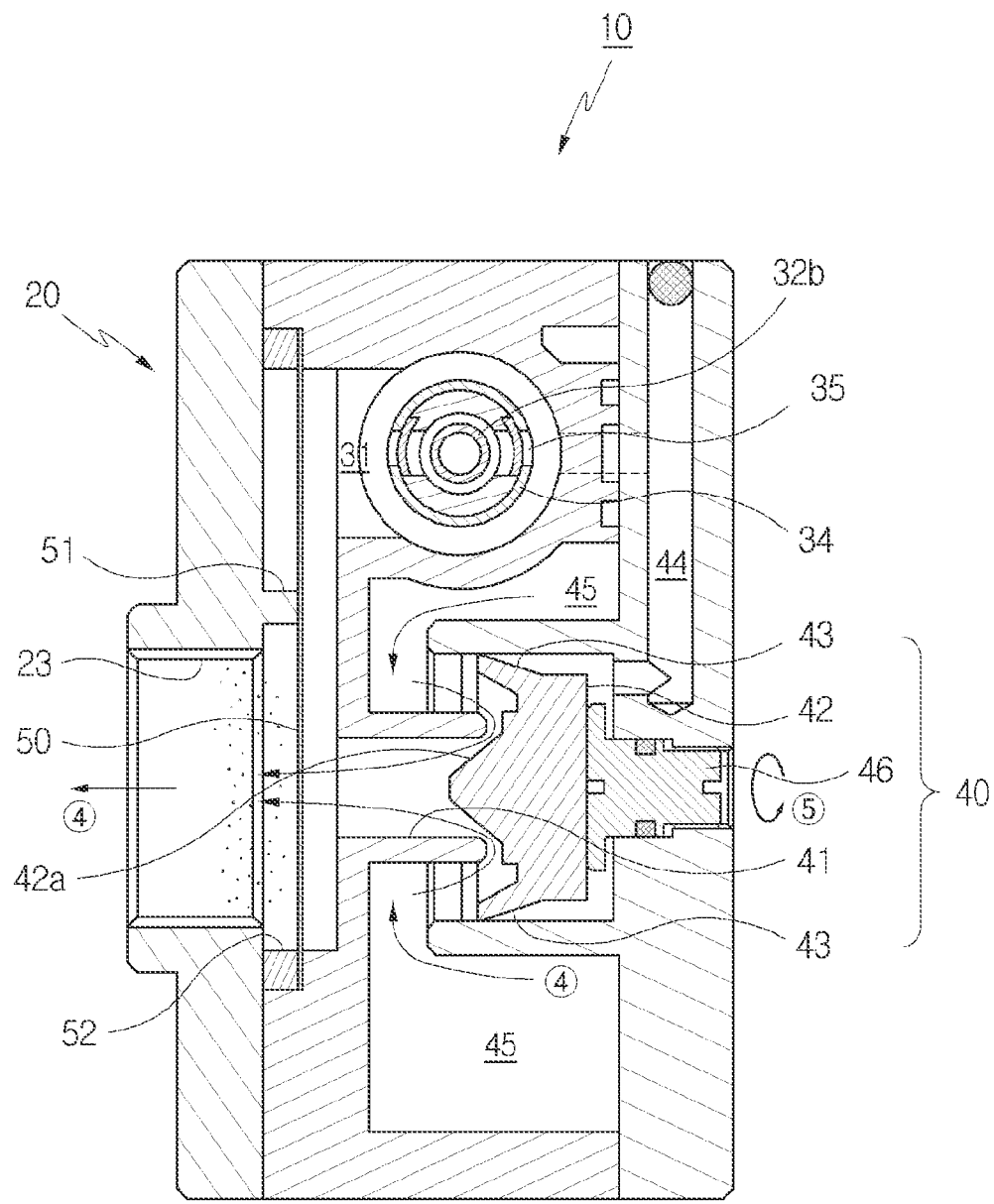

# QUICK-RELEASE VACUUM PUMP

TECHNICAL FIELD

The present invention relates, in general, to a quick-release vacuum pump and, more particularly, to a quick-release vacuum pump which can simply and quickly release the vacuum, and in which stroke can be adjusted when the vacuum is released.

BACKGROUND ART

In the present invention, a vacuum pump that operates using compressed air that is supplied at a high speed and evacuates the space inside a suction pad. When the vacuum pump operates, a vacuum or a negative pressure is formed in the space inside the suction pad. A vacuum transport system holds an object using the negative pressure obtained in this fashion, and transports the object to an intended place.

In general, the vacuum pump includes a casing which has an inlet and an outlet and nozzles which are arrayed in series inside the casing. A space, for example, inside the suction pad extends through the casing and communicates with the inside of the nozzles. Therefore, when compressed air is supplied through the inlet and passes through and is ejected from the nozzles at a high speed, the inner space is evacuated, thereby creating the vacuum or negative pressure for transporting the object.

Once the object has been transported, the vacuum pad must be quickly separated from the object in order to repeatedly carry out subsequent work. However, since the separation is not quickly carried out, that is, it cannot be carried out simply by only stopping the supply of compressed air, a specific design and method capable of forcing the suction pad to be separated from the object are required.

According to related methods that are known, in addition to vacuum lines which are connected to the nozzles, release lines are separately designed such that each line can be supplied with compressed air and be electrically controlled. When the supply of compressed air to the vacuum lines is stopped, the release lines are opened to supply compressed air to the suction pad, so that the vacuum of the inner space of the suction pad is released or broken, thereby separating the suction pad from the object.

These methods are, in fact, available and being used, since they can quickly separate the suction pad from the object by supplying the compressed to the suction pad.

However, these methods have problems in that their electronic/mechanical designs and structures for realizing the methods are complicated, malfunctions are frequent, and maintenance is difficult. Due to these and other problems, these methods are considerably disadvantageous in terms of economic competitiveness, productivity, workability or the like. In addition, there are no solutions to the problem in that the object is damaged by strokes that are applied to the object as the vacuum is released.

DISCLOSURE

Technical Problem

Accordingly, the present invention has been made keeping in mind the above problems occurring with the vacuum pump of the related art, and is intended to provide a vacuum pump, having neither a design nor structure that is complicated, and which can uniformly and accurately operate without malfunctions.

Another object of the present invention is to provide a quick-release vacuum pump which can simply and quickly release the vacuum, and in which stroke applied to an object when the vacuum is released can be adjusted as required. A further object of the present invention is to provide a quick-release vacuum pump in which an air filter is disposed at a suitable position such that the filter can be naturally and repeatedly cleaned without being manipulated.

Technical Solution

In order to accomplish the above object(s), the present invention provides a quick-release vacuum that includes: a casing which comprises a compressed air inlet and a compressed air outlet provided at opposing side sections and an air suction port provided in the bottom; a vacuum pump part which comprises a cylindrical hollow area extending through the casing between the inlet and the outlet, one portion of the hollow area communicating with the suction port, and nozzles disposed in series inside the hollow area, both ends of the nozzles communicating with the inlet and the outlet, and slots of the nozzles communicating with the hollow area; a release part which comprises a support tube provided above the suction port, a skirt-type check valve which is to be moved up and down by air pressure to open and close the upper portion of the support tube, and a pressure chamber provided at the terminal of a passage which communicates with the suction port and passes by a valve skirt; and a control means for controlling a range in which the check valve is to move, the control means extending through an upper surface of the casing and being disposed above the check valve.

It is preferred that the quick-release vacuum pump further includes a filter material disposed between the suction port and the support tube. The filter material filters discharge air that is introduced by allowing the discharge air to pass through upward when the pump part operates, and is cleaned by air that is supplied to the suction port below through the support tube from the pressure chamber when the pump part stops operating.

It is preferred that the nozzles are disposed inside a cylindrical body which has a through-hole in a wall, thereby forming one pump cartridge, with which the nozzles are mounted inside the hollow area.

Advantageous Effects

According to the present invention as described above, when the compressed air starts being supplied to the pump part, the pressure chamber is filled with a certain portion of the compressed air. At the moment that the supply of the compressed air is stopped, the air inside the pressure chamber flows backward, thereby moving the check valve, whereby the vacuum is released. Therefore, the vacuum pump according to the present invention can be more simply designed and realized than vacuum pumps of the related art, and can continuously perform uniform and accurate operation without malfunctions.

In addition, there are no operations required for opening/closing lines and supplying the releasing compressed air. In addition, there are no prior operations, such as an electronic circuit operation, required for such operations. Accordingly, it is possible to more quickly release the vacuum. In addition, it is possible to adjust stroke applied to the object as required when the vacuum is released by operating the control means.

In the meantime, the air inside the pressure chamber is ejected through the filter material when the vacuum is released. At this time, impurities that have stuck to the bottom of the filter material are detached and removed by the air pressure. Consequently, it is possible to naturally and repeatedly clean the filter material without separately cleaning the filter material.

DESCRIPTION OF DRAWINGS

FIG. 1 is a perspective view showing the contour of a vacuum pump according to the present invention;

FIG. 2 is an enlarged cross-sectional view along line "A-A" in FIG. 1;

FIG. 3 is an enlarged cross-sectional view along line "B-B" in FIG. 1;

FIG. 4 is a view explaining the vacuum operation of the vacuum pump according to the present invention; and FIG. 5 is a view explaining the release operation of the vacuum pump according to the present invention.

<Description of the Reference Numerals in the Drawings>

| | |
|---|---|
| 10: vacuum pump | 20: casing |
| 21: inlet | 22: outlet |
| 23: suction port | 30: vacuum pump part |
| 31: hollow area | 32a, 32b, 32c: nozzle |
| 33: slot | 34: body |
| 35: through-hole | 36: cartridge |
| 40: release part | 41: support tube |
| 42: check valve | 43: skirt |
| 44: passage | 45: pressure chamber |
| 46: control means | 51: rib |

MODE FOR INVENTION

The above and other features and effects of the present invention will be more apparent from the following description of certain exemplary embodiments taken in conjunction with the accompanying drawings. In the following drawings, a vacuum pump according to the present invention is designated with reference numeral 10.

Referring to FIG. 1 to FIG. 3, the vacuum pump 10 according to the present invention includes a casing 20 having a certain shape together with other components which are constructed and formed inside the casing 20. The casing 20 includes a compression air inlet 21 and a compression air outlet 22 which are disposed at opposing side sections and a suction port 23 which is disposed in the bottom. In addition, a vacuum pump part 30, a release part 40 and a filter material 50 are included as inner components of the casing 20.

The vacuum pump part 30 is a component that evacuates the inner space of a suction pad and the like connected to the suction port 23 of the casing 20, thereby creating vacuum or a negative pressure.

The vacuum pump part 30 has a cylindrical hollow area 31 which extends between the inlet 21 and the outlet 22 which are at opposite sides of the casing 20, one portion of the hollow area 31 communicating with the suction port 23. The vacuum pump part 30 also includes nozzles 32a, 32b and 32c which are disposed in series inside the hollow area 31. Both ends of the nozzles are connected to and communicate with the inlet 21 and the outlet 22. Slots 33 are provided between the nozzles 32a, 32b and 32c.

According to this embodiment, the nozzles 32a, 32b and 32c include two or more nozzles, and are so-called "multi-stage nozzles" in which the inner diameters thereof gradually increase. It is of course possible to employ a single stage nozzle in other embodiments. In the figures, reference numeral indicates a silencer which is disposed adjacent to the outlet 22 of the casing 20.

Although it is possible to directly dispose the nozzles 32a, 32b and 32c inside the hollow area 31, the nozzles 32a, 32b and 32c are disposed inside the hollow area 31 via a cylindrical body 34 according to this embodiment. Specifically, the nozzles 32a, 32b and 32c are arrayed in series inside the body 34, which forms one pump cartridge 36 including through-holes 35 formed in the wall thereof.

Since the pump cartridge 36 is disposed in the hollow area 31, the nozzles 32a, 32b and 32c are also properly arranged and fixed inside the hollow area 31. In addition, the hollow area 31 can communicate with the inside of the cartridge 36 and the nozzles 32a, 32b and 32c via the through-holes 35. This structure can be considered advantageous over the structure in which the nozzles 32a, 32b and 32c are directly disposed in the hollow area 31 due to mountability, assemblability and firmness.

The release part 40 is a component which quickly releases or breaks the vacuum or the negative pressure that was created in response actuation of the vacuum pump part 30.

The release part 40 includes a support tube 41 which protrudes above the suction port 23 of the casing 20, a skirt-type check valve 42 which is disposed above the support tube 41 and is moved up and down by air pressure in order to open and close the upper opening of the support tube 41, and a pressure chamber 45 which is provided at the terminal of a passage 44 which passes by a valve skirt 43 portion in the suction port 23.

As shown in the figures, the lower end portion 42a of the valve 42 has the shape of a funnel, and is inserted into the upper opening of the support tube 41. This structure is concluded to be optimal to maintain the seal between the valve 42 that moves and the support tube 41 in a good condition, thereby preventing unnecessary air flows.

In this structure, the compressed air that flows through the passage 44 by being supplied through the inlet 21 can flow through the valve 42 into the pressure chamber 45 while pressing against the valve skirt 43 portion. However, the air filled in the pressure chamber 45 does not return in the reverse direction but flows toward the suction port 23 through the support tube 41, the upper opening of which is opened by the air-lift of the valve 42.

According to the invention, the release part 40 further includes a control means 46 which is provided so as to control the range in which the valve 42 can move. The control means 46 extends through the upper surface of the casing 20 and is disposed above the valve 42. Specifically, the control means 46 is a screw, which can adjust the range in which the valve 42 can move by varying the distance "d" between one end of the screw and the head of the valve 42 when rotated to the right or left.

In addition, the filter material 50 is a filtering material that filters the air that has entered through the suction port 23 and then allows the air to flow into the hollow area 31.

The filter material 50 that is applied herein can have any shape, such as a pad or a pleat. The filter material 50 is disposed over the suction port 23, and serves to filter the air that has passed through the suction port 23. Specifically, the filter material 50 is disposed between the suction port 23 and the support tube 41, and has mounting ribs 51 on the upper end of the suction port 23 such that the filter material 50 can be firmly mounted.

The ribs 51 are required to be designed such that they do not obstruct the flow of the air. In the figures, reference numeral 52 designates a gasket.

Referring to FIG. 2 and FIG. 4, a suction pad (not shown) is connected to the suction port 23 of the casing, in which the suction pad will be, of course, in contact with the surface of an object to be transported. In this state, when the compressed air is supplied through the inlet 21 of the casing 20, the vacuum pump part 30 operates. The compressed air passes sequentially through the nozzles 32a, 32b and 32c disposed inside the cartridge 36 at a high speed before being ejected to the outside through the silencer 37 coupled to the outlet 22 (see arrow ① in FIG. 2).

In this process, the pressure is decreased in the portions between the nozzles 32a, 32b and 32c, so that the air inside the suction pad is introduced into the nozzles 32a, 32b and 32c sequentially through the suction port 23, the filter material 50, the hollow area 31, the through-holes 35 and the slots 33. The air is then ejected to the outside along with the compressed air (see arrow ② in FIG. 4).

This evacuation consequently creates vacuum or a negative pressure in the space inside the suction pad, which can then hold and transport the object by the negative pressure.

A portion of the initial compressed air supplied to the inlet 21 flows through the passage 44 which starts from the side of the inlet 21, closes the support tube 41 by pressing against the head of the valve 42, and at the same time, continuously flows into the pressure chamber 45 while pressing against the skirt 43 portion. Consequently, the pressure chamber 45 is filled with the compressed air (see arrow ③ in FIG. 4), which is used for the release.

Referring to FIG. 5, once the object has been transported, the supply of the compressed air is stopped, thereby stopping the operation of the vacuum pump part 30. Consequently, the air inside the pressure chamber 45 flows backward as the great force that was pressing against the head of the valve 42 disappears.

At this time, the skirt 43 and the valve 42 rise by the compressed air that flows backward, and the upper opening of the support tube 41 is then opened, so that the compressed air flows from the pressure chamber 45 sequentially through the support tube 41, the filter material 50 and the suction port 23 into the space inside the suction pad (see arrow ④). Accordingly, the vacuum or negative pressure that is created by the apparatus of the present invention is instantly released.

In this case, if a pressure or stroke applied to the object when the vacuum is released is too strong, the problem of bouncing or damaging the object may occur. In contrast, if the pressure or stroke is too small, the speed at which the vacuum is released is slow such that the transportation operation is obstructed so as not to be properly proceed, which is problematic. The present invention overcomes these problems by properly adjusting the range in which the valve 42 can move by operating the control means 46.

As described above, the range in which the valve 42 can move is adjusted by varying the distance between one end of the screw and the head of the valve 42 by rotating the screw used as the control means 46 (see arrow ⑤). FIG. 4 and FIG. 5 show the state in which the range in which the valve 42 can move is adjusted to be smaller than that of FIG. 3.

The apparatus 10 according to the present invention has an evacuation/release mechanism that separately stores part of the evacuating compressed air and uses it for releasing the vacuum when the vacuum state is stopped. Therefore, this apparatus can be more simply designed and embodied than the design of the related art that depends on an electronic mechanism for the evacuation and release operations. In addition, this apparatus can continuously perform uniform and accurate operation, and in particular, the release of vacuum can be quickly carried out. In particular, since the control means 46 is provided, the stroke can be suitably adjusted as required when the vacuum is released.

When the vacuum pump part 30 operates, the air discharged from the suction pad is filtered while passing through the filter material 50. Therefore, impurities stick to the bottom of the filter material 50 (see FIG. 4). When the operation of the vacuum pump part 30 is stopped, the compressed air that has passed through the support tube 41 passes through the filter material 50 from top to bottom and flows into the suction port 23.

In this process, impurities that have stuck to the bottom of the filter material 50 during the evacuation are detached and removed. Consequently, the cleaning of the filter material is naturally and repeatedly carried out even though the cleaning is not separately carried out. The check valve 42, the support tube 41, the filter material 50 and the suction port 23 are arranged in the top-bottom relation in a line in order to realize the structure for quick release and effective filter cleaning, and this arrangement is determined to be advantageous over any other arrangements.

The invention claimed is:

1. A quick-release vacuum pump comprising:
    a casing which comprises a compressed air inlet and a compressed air outlet provided at opposing side sections and an air suction port provided in a bottom;
    a vacuum pump part which comprises a cylindrical hollow area extending through the casing between the inlet and the outlet, one portion of the hollow area communicating with the suction port, and nozzles disposed in series inside the hollow area, both ends of the nozzles communicating with the inlet and the outlet, and slots of the nozzles communicating with the hollow area;
    a release part which comprises a support tube provided above the suction port, a skirt-type check valve which is to be seated on an upper portion of the support tube and moved up and down by air pressure of the compressed air provided through the inlet to open and close the upper portion of the support tube, wherein a lower end portion of the check valve is funnel shaped and is inserted into an upper opening of the support tube, and a pressure chamber positioned at a terminal of a passage which communicates with the inlet and passes by a valve skirt;
    a control means provided for adjusting a range in which the check valve is to move up, an end of the control means extending through an upper surface of the casing and being disposed above the check valve at a distance from a head of the check valve; and
    a filter material which is disposed between the suction port and the support tube, wherein the filter material filters discharge air that is introduced by allowing the discharge air to pass through upward when the pump part operates, and is cleaned by air that is supplied to the suction port below through the support tube from the pressure chamber when the pump part stops operating, and
    wherein the control means comprises a screw, which is to adjust the range in which the valve is to move up by varying the distance between the end of the screw and the head of the check valve when rotated to right or left.

2. The quick-release vacuum pump according to claim 1, wherein the nozzles are disposed inside a cylindrical body which has a through-hole in a wall, thereby forming one pump cartridge, with which the nozzles are mounted inside the hollow area.

3. The quick-release vacuum pump according to claim 1, wherein a mounting rib is provided on an upper end of the suction port such that the filter material is firmly mounted.

4. The quick-release vacuum pump according to claim 1, wherein the check valve, the support tube, the filter material and the suction port are arranged in a top-bottom relation in a line.

\* \* \* \* \*